July 8, 1969

G. NOMARSKI 3,454,340

INTERFEROMETRY

Filed March 2, 1965

INVENTOR
GEORGES NOMARSKI,

BY

ATTORNEYS.

INVENTOR
GEORGES NOMARSKI,

BY

ATTORNEYS.

July 8, 1969  G. NOMARSKI  3,454,340
INTERFEROMETRY
Filed March 2, 1965

INVENTOR
GEORGES NOMARSKI,
BY
ATTORNEYS.

INVENTOR
GEORGES NOMARSKI,
BY
ATTORNEYS.

July 8, 1969  G. NOMARSKI  3,454,340
INTERFEROMETRY
Filed March 2, 1965  Sheet 6 of 7

INVENTOR
GEORGES NOMARSKI,
BY

ATTORNEYS.

INVENTOR
GEORGES NOMARSKI,

BY

ATTORNEYS.

United States Patent Office 3,454,340
Patented July 8, 1969

3,454,340
INTERFEROMETRY
Georges Nomarski, Bourg-la-Reine, France, assignor to Centre National de la Recherche Scientifique, Paris, France, a corporation of France
Filed Mar. 2, 1965, Ser. No. 436,628
Claims priority, application France, Dec. 15, 1964, 998,510
Int. Cl. G01b 9/02; G02b 21/14
U.S. Cl. 356—106                    8 Claims

ABSTRACT OF THE DISCLOSURE

An interferometer arrangement for the study of transparent or opaque objects wherein a pinpoint source of light and a condenser and an observation lens are employed together with two wave duplicators, said elements cooperating to furnish ordinary and extraordinary images of the source in the exit pupil of the objective.

---

The present invention relates to improvements in interferometer arrangements and, more particularly, to an interferometer device carrying such improvements into effect. The interferometer device according to the invention presents the advantage, as compared with the known devices, of being of simple construction, easily adjustable, delivering stable interferograms and offering a greater field of possible applications.

Interferometers are presently known, which make use of two wave duplicators, such interferometers being also designated, on account of their mode of operation, as a focusing deficiency interferometer, such as the Philpott, Smith and Dyson devices; in these known arrangements, a source is used for the illumination of the object to be examined and of which the interferential image is observed, whereby the reference wave traverses said object while undergoing necessarily a disturbance; this will result in a certain blurring of the image by the residual structure of the reference wave due to the fact that the focusing deficiency is practically never sufficient. On the other hand, the ordinary image of the source is formed on the object by a beam of a large angular aperture, which causes the coherence and the contrast of the fringes to be reduced. In practice, the use of interferometers with lack of focusing is generally limited to the study of object having a small surface, with respect to the surface of the field object, while presenting but small optical path variations.

Applicant then conceived that these drawbacks could be avoided, while securing other desirable advantages, by causing the reference beam to pass through a nearly pinpoint area of the object. Thus, the following concepts were developed which form the basic principles of the invention and which will be stated hereinafter with reference to FIGURE 1 of the attached drawings.

In this figure, S is a source of white light, of a small diameter, but of good luminance, C a condenser associated with a first wave duplicator (not illustrated for simplicity), A a transparent object, O an observation lens associated with a second wave duplicator (also not represented for clearness). Object A is marked by a distribution of its optical thicknesses $W(\rho, \theta)$ in polar coordinates $\rho$ and $\theta$ relative to its center. Under these conditions, condenser C forms an ordinary image $S_1$ of S, whereas the waves duplicator, by splitting the wave $\Sigma$, provides simultaneously an extraordinary image $S_2$ of the same source S, located for instance ahead of $S_1$ and at a distance $l$ of $S_1$. The unit or structure formed by the condenser and the first wave duplicator is selected in such a manner that the two images $S_1$ and $S_2$ are formed by beams having the same angular aperture $u$. Object A is placed in coincidence with the secondary source constituted by image $S_1$.

In this case, the wave $\Sigma_1$, coming form $S_1$ continues its path beyond the object without any disturbance: $\Sigma_1$ is consequently, here, the reference wave. On the contrary, the wave $\Sigma_2$ issued from $S_2$ reaches the object A inside a circular zone of radius $\rho = l \tan u = S_1 A_1$.

The observation objective, represented as a lens O, forms two new images $S_1'$ and $S_2'$ of S, whereas the wave duplicator associated with O brings the image $S_1'$ back in the same plane as that of image $S_2'$: image $S_2'$ is therefore an ordinary image of image $S_2$ in lens O and image $S_1'$ its extraordinary image obtained through the second wave duplicator. As a matter of fact, these two coherent secondary sources are not identical; image $S_1'$ is effectively a geometrical image of S and $S_1$, but image $S_2'$ is surrounded by a halo or blurring which is the diffraction pattern of the object and carries all the informations on its phase structure. The emergent wave $\Sigma_1'$ carries the impression of the object and is marked by a distribution of the optical paths $W'(\rho, \theta)$, substantially equal to that of the object, as shown by the following relation:

$$W'(\rho, \theta) = W(\rho, \theta) \cos u_n$$

where $\cos u_n$ is the obliquity factor near unity and $u_n$ is related to $u$ by the relation:

$$n \sin u_n = \sin u$$

where $n$ is the refractive index of the object.

The waves $\Sigma_1'$ and $\Sigma_2'$ emitted by $S_1'$ and $S_2'$ may interfere inside the hatched area as represented in FIGURE 1: the interferential image—or the interferogram—of object A may be intercepted or piched in plane A', conjugated with plane A, in the ordinary sense, relative to the objective O.

In particular, the image of a point $A_1$ at the margin of the field occurs in $A_1'$.

The distribution of illumination $I(l, \theta)$ in plane A' is given by the following relation:

$$I(\rho, \theta) = 1 \pm \cos 2\pi/\lambda \cdot [W(\rho, \theta) - W(O, O)] \cos u_n$$

where $\lambda$ is the wavelength, $W(\rho, \theta)$ and $\cos u_n$ were defined above, and $W(O, O)$ is the optical thickness of the objective in its center ($\theta = 0$, $\rho = 0$). The sign will depend on the type of interferences, which may have either a white, or a black center.

The formula defines the so-called flat-tint interferences observed when the images $S_1'$ and $S_2'$ are in precise coincidence.

In the case illustrated in FIGURE 1, images $S_1'$ and $S_2'$ are slightly shifted laterally and, in this case, the interferogram is crossed by parallel fringes.

If it is desired to observe visually the interferences, the pupil of the eye shall be placed at the site of images $S_1'$ and $S_2'$.

It may, besides, be inferred fom FIGURE 1 that the system proposed has the following remarkable property: on the one hand, condenser C delivers from the point source S, without any wave duplicator, an ordinary image in the plane of the object A, and on the other hand, the image A' of object A is formed by objective O without the intervention of an associated wave duplicator.

Based on the above considerations, the invention provides an interferometry method for the study of a transparent object by using two wave duplicators, a condenser illuminated by a white source of a small diameter and adequate luminance, and an observation lens, the system being assembled in such a manner that the ordinary source image formed by the condenser, and the extraordinary image thereof, formed by the first wave duplicator, are spaced apart from one another and are formed by angular beams of the same opening, that the ordinary image coincides with the object to be examined, that the observation lens provides directly an ordinary of said first extraordinary image of the source and, in combination and with the second wave duplicator, an extraordinary image of the first ordinary image of the source, both said secondary images and the source being formed in the exit pupil of the objective, whereas the interferential image of the object is in a plane conjugated with the plane of the object with respect to the objective.

An apparatus according to the invention may be designated as a point-reference interferometer.

It may be interesting, in this connection, to note that when, in the arrangement accoding to the invention such as described hereinabove, the substantially point source is replaced by an extended source whose image in the condenser covers the object to be examined, and taking any one point P of said source, the images $P_1$ and $P_2$ thereof are anew found in the plane of the object and in the plane of image $S_2$, respectively, but the two secondary sources will then have opposite functions to those indicated according to the invention, the wave issued from $P_2$ being the one serving as a reference wave for the wave issued from $P_1$: the reference wave will thus pass through the object and undergo a blurring which the invention enables to avoid. In this case of an extended source, an interferential image may be observed formed in the plane of the exit pupil $S_1'S_2'$ of the arrangement according to the invention; this interferential image is, besides, the extraordinary image of object A in the objective O formed in combination with the duplicator. In addition, the above considerations show that the interferometer apparatus according to the invention is not limited in its application to the study of objects with small optical-path variations, except as relates the small reference range $S_1$ at the center of the object where the optical thickness must remain constant.

It may be seen, moreover, that distance $l$ separating the ordinary and the extraordinary images does not, in the present device, act in a way corresponding to a lack of focussing: this distance $l$ is a parameter of the apparatus selected as a function of the opening $u$ of the illuminating beam and of the ray $\rho$ of the field object:

$$l = \rho/\tan u$$

The operation of the point-reference interferometer according to the invention may furthermore be also explained by noticing that the illumination $E(\rho, \theta)$ at the current point $(\rho, \theta)$ of the interferential image results from the interference between the paths of the two rays, of which the first traverses the object at the conjugated point $(\rho, \theta)$ and the second at its central point $(O, O)$; these two rays are parallel, slanted relative to the axis by the same angle $u$ and contained in the same azimuth plane $\theta$. This shows clearly that the principle of the apparatus according to the invention is fundamentally different from the known principle of an interferometer with focussing deficiency; it may also be noted that the physical principle of the invention is more adequate, i.e., more sharply defined, resulting in a better operation of the device.

The wave duplicators—or beam separators—associated with the observation optics and with the condenser, are, according to the invention, identical to one another, and shall in any case have identical properties. According to the invention, each one of these duplicators must allow the formation of an additional focal point—termed above as "extraordinary focus," separated from the ordinary focus of the lens by quite a great distance $l$. In addition, the duplicator must be such that its extraordinary beam should have the same angular opening as the ordinary beam produced by the lens only. Such beam separators are optical devices the action of which is either independent from the features of the lenses with which they are associated, or is intimately related to these lenses. It is for instance possible to provide arrangements comprising either the combination of the existing mirrors of the Sagnac so-called antiparallel wave interferometers, or else to provide arrangements with birefringent prisms, as beam separators. It shall be noted that it is possible to use, in certain cases, a single duplicator or equivalent element, acting thus successively as the first and the second of said duplicators.

The separators independent from the lenses are generally located in the object space, i.e., between the condenser and the object, or between the object and the objective. They are a focal and formed of plane surface optical elements. It is obvious that such a separator may equally be placed in the image space, provided that the conveying system ensuring the object image conjugation should be constituted by a system of nonfocal lenses.

The invention will be exposed in details in the following description and appended drawings relating to various examplary arrangements including duplicators according to the invention, as well as to various applications of the invention; in the drawings.

Figure 2:
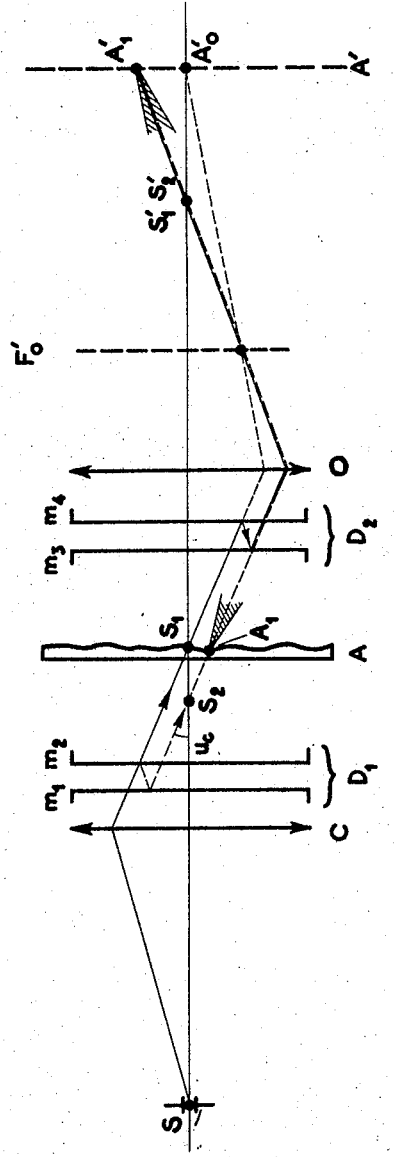
FIGS. 2 through 5 illustrate various embodiments including mirror duplicators.

In FIGURE 2, the first duplicator $D_1$ consists of two plane mirrors $m_1$, $m_2$ and the second duplicator $D_2$ of two plane mirrors $m_3$, $m_4$, the distances separating the two pairs of mirrors being identical. Thus, a first image $S_1$ of source S is obtained by means of the beam transmitted through duplicator $D_1$ ($m_1$ and $m_2$), which constitutes the reference beam. A second image $S_2$ of source S is formed at a distance $l=S_1S_2$, equal to twice the interstice $m_1$, $m_2$, as calculated in the air. It is seen that the axial shift $l$ depends neither from lens C, nor from the position of $m_1m_2$ relative to the object.

The second separator $D_2$ (mirrors $m_3$, $m_4$) enables the two representative rays to be joined, one thereof passing through the center and the other through a point $A_1$ at the bottom of the field. The two beams will then form a common focal point in $S_1'$, $S_2'$ which constitutes the exit pupil of the interferometer and the interferential image of object-point $A_1$ will be observed in $A_1'$.

The two mirror pairs are preferably formed of two identical glass plates coated with semireflecting films.

In order to control or adjust the number of fringes, one of said glass plates may be advantageously slightly pivoted, resulting in a lateral shift of image $S_2$ and therefore in a lateral separation of images $S_1'$ and $S_2'$.

The thickness $d$ of each glass plate is determined as follows, as a function of the field-object and of the angular opening $u_c$ of the light beam. The formula used is $$l = S_1A_1 = \tan u \text{ and } l = 2d/n$$

$n$ being the refractive index of the plate considered.

It is of interest to know the value of the light transmission ensured by the device; to this end, the reflection factor R of mirrors $m_1$, $m_2$, $m_3$ and $m_4$ is determined, which assures the highest luminosity to the device. Amplitudes $a_1$ and $a_2$ of both waves of the interferometer are, respectively:

$$a_1 = t_1 t_2 t_3 r_4 r_3 t_4 = t^4 r^2$$

$$a_2 = t_1 r_2 r_1 t_2 t_3 t_4 = t^4 r^2$$

where $t$ and $r$ are the amplitudes transmitted and reflected by the mirrors $m_1$ to $m_4$, assumed to be identical in the present case. It is known that the transmission of an interferometer is defined by the intensity $I_M$ of the white interference fringes:

$$I_M = (a_1 + a_2)^2 = 4(t^4 r^2)^2 = 4T^4 R^2 = 4T^2(1-T)^2$$

where $T=t^2$ and $R=r^2$ are the reflection factors of the mirror considered.

The derivative $dI_M/dT$ of the above intensity $I_M$ cancels for the optimum value of transmission T to which corresponds the best value of R:

$$\frac{dI_M}{dT} = 4T^3 - 10T^4 + 6T^5 = 0$$

and thus $T=\frac{2}{3}$ and, consequently, $R=\frac{1}{3}$.

The maximum intensity $I_M$ or the maximum transmission of the interferometer according to the invention will then be:

$$I_M = 4T^4R^2 = 4(\tfrac{2}{3})^4 \cdot (\tfrac{1}{3})^2 \simeq 9\%$$

This shows the particular importance of the selection of the reflection factor R of the mirrors; if instead of $R=\frac{1}{3}$, use is made, for instance, of the value $R=\frac{1}{2}$, the maximum transmission achieved will be $I_m \simeq 6\%$.

Figure 3:
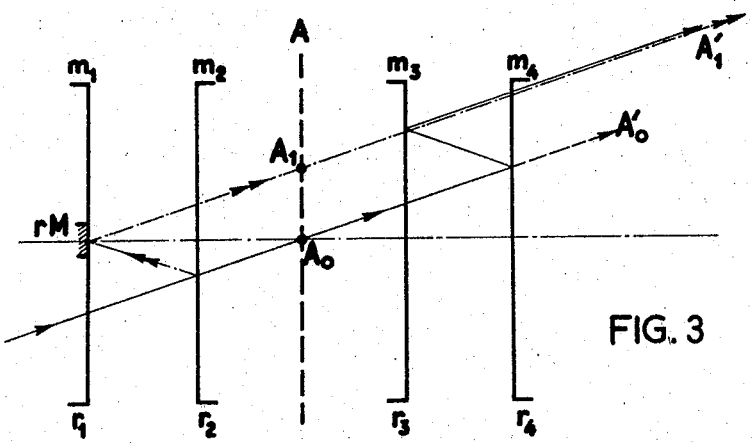

It is possible to substantially improve, in a simple manner, the transmission quality of an interferometer of the type described hereinabove. To this end (FIGURE 3), the pair of mirrors $m_1 m_2$ is located in such a manner that the image $S_2$ of source S is formed on mirror $m_1$: the semitransparent treatment is replaced by an opaque reflecting layer having a reflection $R_1=1$, the extension of the layer being limited to the surface occupied by the image $S_2$ of source S. The reflection factors of the dielectric mirrors $m_2 m_3$ and $m_4$ are then determined by a calculation similar to that provided in connection with the example of FIGURE 2 and deliver the maximum intensity of the white fringes of the interferometer: this calculation shows that the maximum transmission $I_M$ reaches 19% with the reflection factors $R_1=1$, $R_2=0.19$ and $R_3=R_4=0.43$.

Figure 4:
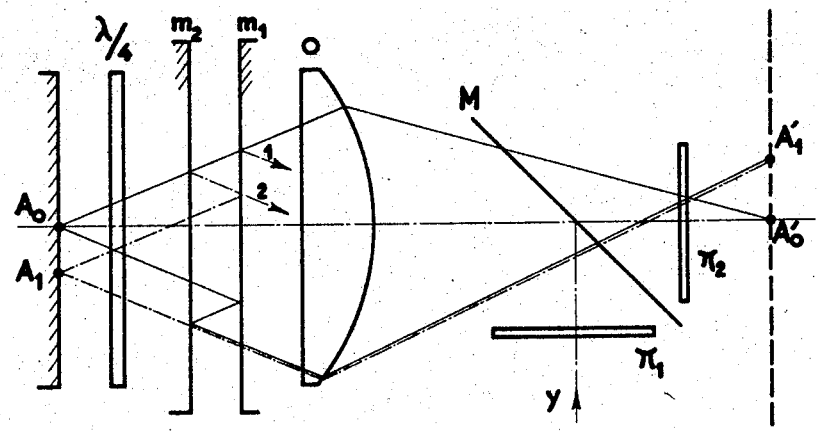

The arrangement in FIGURE 2 may be modified to permit the study of reflecting surfaces. From the device in FIGURE 2, folded about the straight line $S_1A_1$ passing through the object, there has been realized the apparatus shown diagrammatically in FIGURE 4 for the study of the reflecting surfaces.

Mirrors $m_1$ and $m_2$ are shown separated from distance $l$ and the incident beam conveyed thereto by a semitransparent mirror M. In order to eliminate any stray light due to direct reflection (as shown by arrows 1 and 2) of the incident ray on mirrors $m_1$ and $m_2$, the crossed polarisers $\pi_1$ and $\pi_2$ have been provided, whereas a quarter-wave plate $\pi/4$ inserted between object A and mirror $m_2$ opens the way to the light partaking in the interferences.

This quite simple arrangement has however, because of the additional optical elements, a luminosity which is about eight times lower than that of an interferometer according to the invention and working in a transmitted light. By suppressing the lighting mirror M and placing the source S itself in the center $A_0'$ of the image plane, a luminosity factor may be obtained which is lower by only a factor of 4.

In spite of the comparatively low luminosity, the arrangements just described may be advantageously used in mean and high-magnification microscopy, where there is but little space for the optical elements inserted in front of the objective and the condenser.

A further embodiment of the method according to the invention makes use of duplicators or oblique-reflecting-surface separators, which reduce at a minimum the number of crossings through the semi-transparent mirrors. This alternative embodiment, which is of interest on account of a higher maximum transmission, is particularly advantageous in the case of a low magnification microscope or, more generally, in the case of so-called macroscopic objects.

Figure 5A:
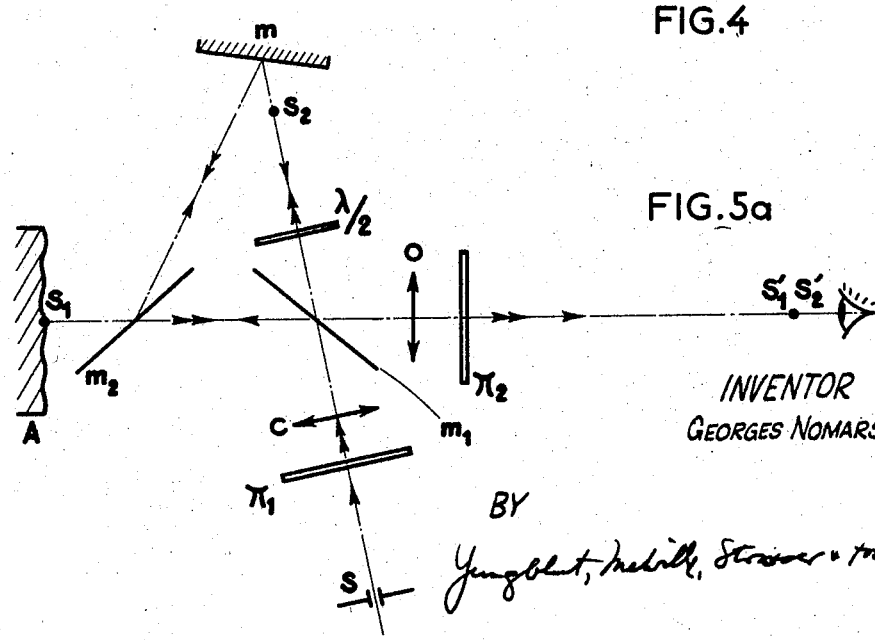

A first such arrangement is illustrated in FIGURE 5a, restricted to an operation in reflected light. The arrangement includes two semitransparent mirrors $m_1$ and $m_2$, and a transfer mirror $m$. The lighting lens C transmits an image $S_1$ of the near-point source S onto the center of the reflecting object A, whereas a second image $S_2$ of source S is formed in $S_2$ at a distance $l=m_1mm_2-m_1m_2$. The objective O, whose object-focus coincides with the object, enables the observation of the interferences provided the pupil is placed in the blended image $S_1'$, $S_2'$ of $S_1$ and $S_2$. The process is the same as that described with reference to FIGURE 1.

The amplitudes of both waves are as follows:

$$a_1 = r_1 t_1 r_1 r_2 = r^3 t$$
$$a_2 = t_1 r_2 t_2 t_1 = r t^3$$

the maximum intensity is:

$$I_M = (a_1+a_2)^2 = r^2 t^2 = RT$$

The optimum value, equal to 0.25, is obtained with $R=T=0.5$. It will be noted that to the two reflections of the first beam correspond two transmissions of the second beam. It is known that the phase difference of the two waves is then equal to $\pi$ provided the separators $m_1 m_2$ are not of an absorbing character. The interference fringe corresponding to a zero difference of the optical paths is thus black and achromatic, which is an advantage.

In FIGURE 5a, there are shown two crossed polarisers $\pi_1$ and $\pi_2$, and a half-wave plate $\lambda/2$ placed between mirrors $m_1$ and $m_2$. Those polarisers and the half-wave plate enable to eliminate the parasite wave of amplitude $a_4$, the only one likely to be restrictive. In addition to the interference rays:

$$a_1 = r_1 t_2 r_2 r_1$$

and $$a_2 = t_1 r_2 t_2 t_1$$

there still exist two undesirable rays:

$$a_3 = r_1 t_2 t_2 t_1$$
$$a_4 = t_1 r_2 r_2 r_1$$

Ray $a_3$ is of no avail, since it passes through the center of the image, whereas the second ray $a_4$ gives a blurred image which is superposed on the interferential image. This stray wave of amplitude $a_4$ is eliminated by cross polarisers $\pi_1$ and $\pi_2$ and, for instance, the half-wave plate $\lambda/2$.

Figure 5B:
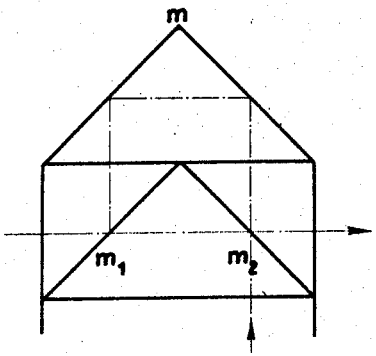

FIGURE 5b corresponds to a particularly advantageous embodiment of this arrangement. In the illustrated case, the separators $m_1$ and $m_2$ include the 90°-faces of a rectangular isosceles prism assembled by bonding to another similar prism and operating by total reflection.

The interferometer equipped according to FIGURE 5b may serve for studying transparent objects owing to the identical wave duplicators; it will however be noted that, in this case, the stray wave $a_4$ mentioned above does not form and thus the additional polarising devices are not required.

Figure 1:
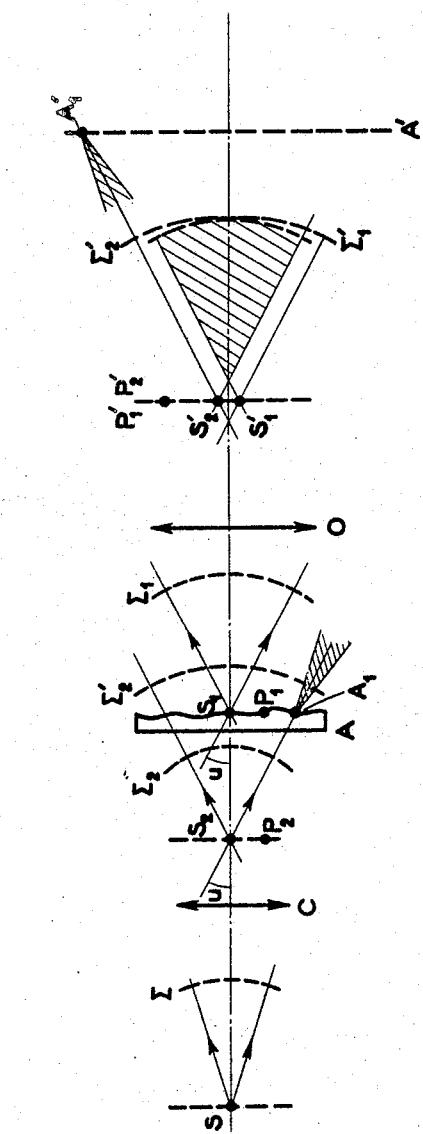

In a general manner, any assembly with oblique mirrors of which one at least is semitransparent, and which, unfolded along a straight line, is equivalent to the diagram illustrated in FIGURE 1, may be utilized for the applications according to the invention.

Figure 6:
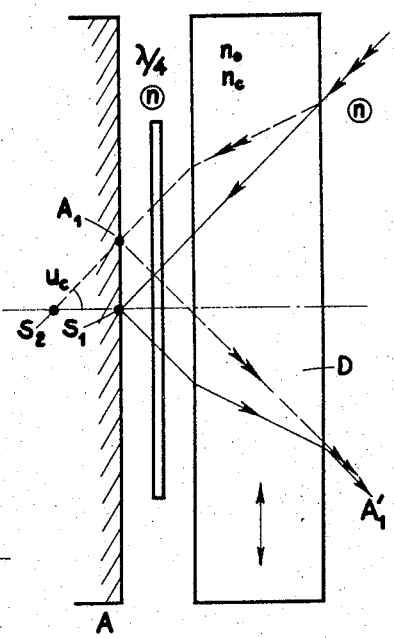
FIGS. 6 and 7 represent duplicator devices of refringent material.

FIGURES 6 and 7 correspond to wave duplicators independent from the lenses and using refringent material.

The duplicator illustrated in FIGURE 6 consists of a plane parallel calcite plate D arranged parallel to object A assumed to be reflecting. The optical axis of the crystal is perpendicular to the optical axis of the interferometer. The ordinary beam (illustrated as a single solid-line ray) forms, in the center of object A the image $S_1$ of the point-source S (not illustrated). The extraordinary beam (in dashed lines) forms a virtual image $S_2$. The index $n$ of the ambient medium is assumed equal to the ordinary index $n_0$ of the calcite. The field of ray $l$ is determined by the formula already mentioned:

$$p = S_1 A_1 = l \tan u_c$$

where $l$ is the distance separating axially, the two ordinary and extraordinary images:

$$l = n \cdot \frac{\Delta n}{n \cdot n_e} \cdot d \simeq 0.11 d$$

$n_o$ and $n_e$ being the ordinary and extraordinary indexes, respectively, of the calcite. The device comprises, in addition, the quarter-wave plate $\lambda/4$ located between the object and the calcite plate and oriented at an angle of 45° relative to the plane of the figure, and two polarisers (not illustrated). The quarter-wave plate allows the optical paths to be compensated for, by rotating the polarisation plane by an angle of 90° for rays which traverse the same twice.

A similar device for the study of transparent objects will include two identical calcite plates between which the object to be studied and a half-wave plate are placed.

The transmission factor of all the interferometers according to the invention is in principle equal to 25% when birefringent elements are included.

Figure 7C:
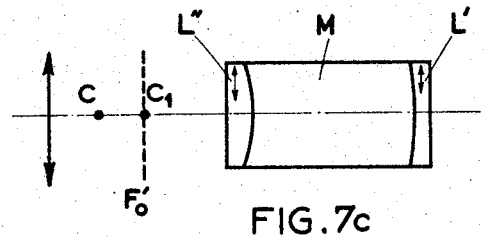
Figure 7A:
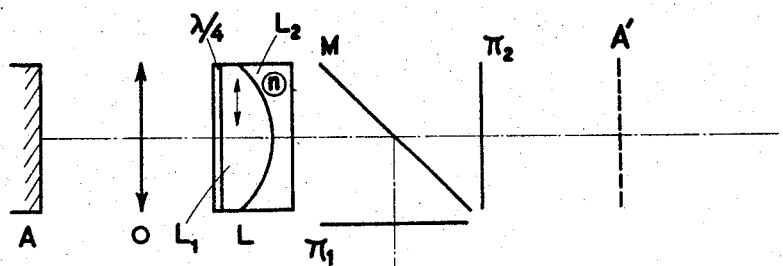
Figure 7B:
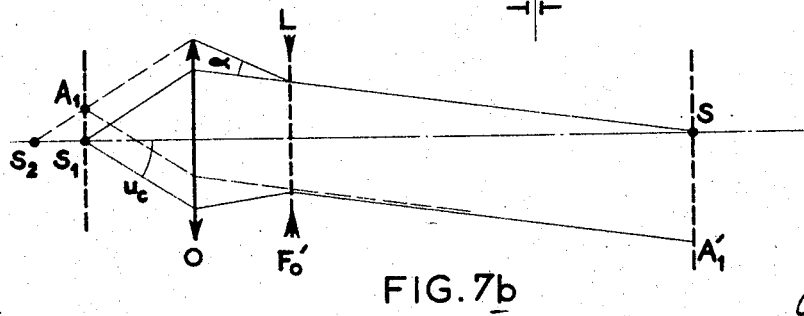

According to another embodiment of the invention, a further focusing action is made use of over a portion of the beam traversing the duplicators according to the invention. In a first examplary case, as shown in FIGURES 7a, 7b, 7c, various possibilities of this embodiment are illustrated. Referring to FIGURE 7a, an interferometer according to the invention comprises a birefringent lens L associated with a lighting or observation lens O.

Lens L includes a plano-convex lens $L_1$ of calcite and a plano-concave lens $L_2$ of a glass having a refractive index $n$ equal to the ordinary index $n_o$ of the calcite. The ordinary focal length of lens L is infinite and its extraordinary focal length is equal to $f_B$:

$$f_B = B/\Delta n$$

where B is the curvature radius and $\Delta n$ the birefringency:

$n = n_o - n_e = 0.17$ for the calcite

A quarter-wave plate $\lambda/4$ oriented at an angle of 45° of the figure is placed between lens L and the object A, assumed here to be reflecting.

The light issued from source S and polarised by device $\pi_1$ is directed onto object A by means of semitransparent mirror M. The beam reflected by object A traverses mirror M and after its being analyzed by the polariser $\pi_2$ reaches the plane image A′ conjugated with object A relative to the objective O considered alone.

The operation of the birefringent L associated with objective O clearly appears from FIGURE 7b. This lens is placed in the focal-image plane of objective O; in this case, the power of the combined lenses O and L is not modified. The ordinary beam provides the image $S_1$ of source S and the extraordinary beam provides the image $S_2$, both beams having the same aperture $u_c$. The marginal ray of the extraordinary wave illuminates a point $A_1$ placed at a distance $l$ of center $S_1$ given by:

$$l = h \cdot f/f_b$$

where $f$ is the focal length of objective O and $h$ the pupilar height:

$$h = f \sin u_c$$

and thus:

$$l = f^2/f_B \cdot \sin u_c$$

In the case of FIGURE 7c, the optical center of the birefringent lens is located outside. Such a lens may therefore be readily associated with an objective of the microscope the focal plane of which is not accessible.

Lens L includes a glass meniscus M, the two spherical faces of which are concentric about the center C; on this thick meniscus are pasted two calcite lenses L′ and L″, the assembly forming a plate with plane and parallel faces. The image of center C in the plane face of the plano-convex lens is in $C_1$ and everything happens as if the lens were concentrated in $C_1$.

The birefringent lens arrangements are readily applicable to micrsocopes operating according to the autocollimation principle, but less readily in microscopes for transparent objects because of the difficulty to render identical the two separated lenses.

Figure 8A:
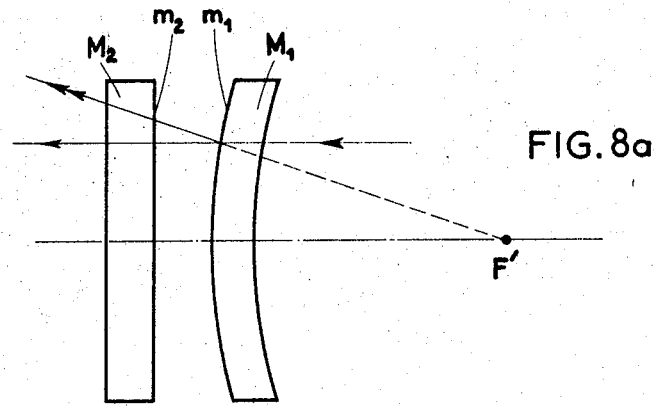
FIG. 8 is an example of a nonfocal optical element having semireflecting spherical surfaces.
Figure 8B:
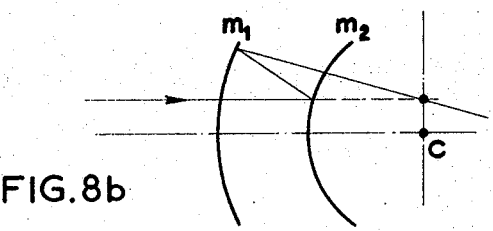

In the case of FIGURES 8a and 8b, a bifocal optical element is used by means of semireflecting spherical surfaces.

FIGURE 8a illustrates a plate $M_2$ and a glass meniscus $M_1$, rendered, respectively, reflecting, semitransparent ($m_1$, $m_2$). In the present case, the assembly is equivalent to a divergent lens having a focal length equal to half the radius of the spherical reflecting surface $m_1$.

The element of this type has the same function as the above described birefringent lens.

This arrangement presents a high focusing efficiency, but has the drawback of being of a low luminosity. The transmission of an interferometer according to the invention, provided with such bifocal elements, is in fact identical to that of an interferometer equipped with four plane, semitransparent mirrors, as described in relation with FIGURE 2. The best value of its reflection factor is also equal to ⅓.

The modification illustrated in FIGURE 8b includes a bifocal element adapted to localise the focusing action outside the two mirrors. As in the case of a birefringent lens, two concentric surfaces $m_1$ and $m_2$ are used, whose action on the twice reflected beam is equivalent to that of a lens placed on the common curvature center C of mirrors $m_1$ and $m_2$.

The above described devices apply more particularly to the study of reflecting surfaces, except the arrangement in FIGURE 1 which, with its four semitransparent mirrors, may apply more readily to the study of transparent objects. The reason is that the two wave duplicators associated, respectively, with the condenser and with the objective, blend in one in the case of reflected light, resulting in self-compensation through autocollimation, whereas, with transparent objects, the two wave duplicators are physically separated and they must be made optically identical, to within a fraction of the wavelength.

Figure 9A:
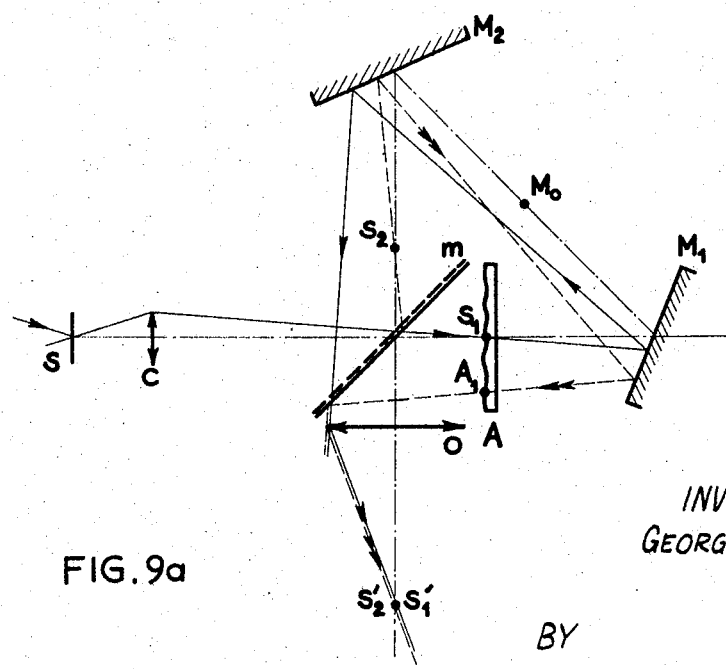
FIGS. 9 through 12 illustrate various applications comprising reflecting surfaces.

To facilitate the study of transparent objects, and according to another feature of the invention, a self-compensated wave duplicator is used, as shown, by way of example, in FIGURE 9a. All the essential elements of a reference-point interferometer also appear in this arrangement, including a focal wave duplicator, placed in the space separating the lighting and observation lenses.

Figure 9B:
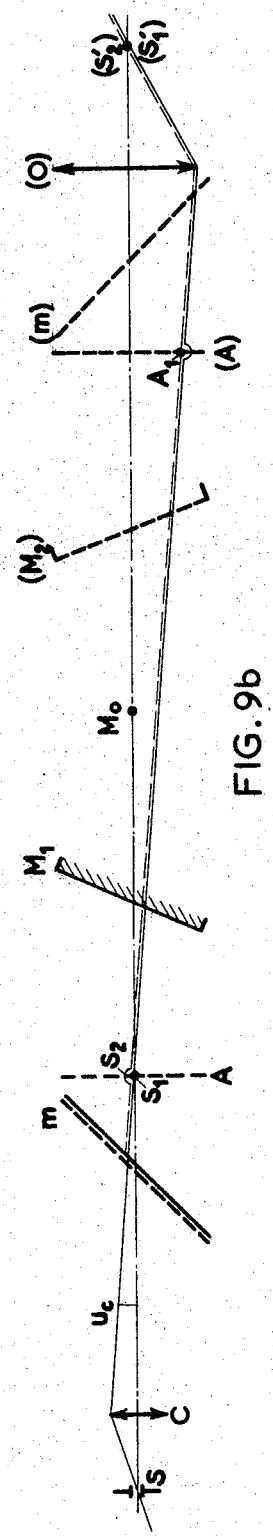

S is a point-source of which condenser C forms an image $S_1$ at the center of the transparent object A located directly after the semitransparent mirror $m$; a second image $S_2$ of source S forms on the axis of the beam reflected by mirror $m$. The two beams are reflected one against the other by two opaque mirrors $M_1$ and $M_2$ so that the light reflected by mirror $m$ moves on the right and the light transmitted to the left moves inside a triangle $mM_1M_2$ (see arrows). The two coherent waves emitted by the secondary sources $S_1$ and $S_2$ are recombined by the same mirror $m$ and may emerge towards the objective O the object-focus of which coincides with the object plane. The blended images $S'_1$ and $S'_2$ of sources $S_1$ and $S_2$ define the exit pupil of the interferometer. FIGURE 9b corresponds to the unfolded FIGURE 9a. The operation of the arrangement is shown by referring to this FIGURE 9b. The two beams are represented by a single ray having an angular opening $u_c$ split in two by mirror $m$. For the transmitted ray (shown in solid lines), the object occurs in A, whereas for the reflected ray (shown in dotted lines), the object does not occur in A, but but in (Δ), symmetrical to A relative to point $M_0$ located midway of distance $mM_1M_2m$. Thus, everything happens as if the two rays follow the same path, traversing the same object in the center thereof and at a lateral point $A_1$, respectively. Ray $\rho$ of the object field is approximately given by the relation:

$$\rho = l \tan u_c \text{ with } l = 2S_1M_0$$

The arrangement of mirrors $mM_1M_2$ is one of the "Sagnac" arrangements, but is used here quite differently. As a matter of fact, the object A must be placed as far as possible from $M_0$ or very close to $m$; on the other hand, a lens C is required sending out a real image $S_1$ of a point source S. Under these conditions, objective O, which may be a lens such as a magnifier, allows the observation of a perfectly defined interferential image, and not of an image resulting from superposing two shifted or reversed images, as in the case of the Sagnac-type interferometers.

The present invention also aims at providing any number of tansfer mirrors such as $M_1$ and $M_2$, without modifying the operation of the interferometer according to the invention. The apparatus may be carried out in various ways, of which a few practical examples are illustrated in FIGURES 10, 10a, 10b and 10c.

Figure 10B:
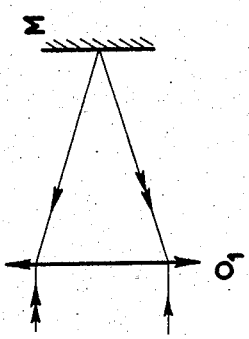
Figure 10A:
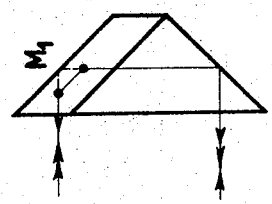
Figure 10:
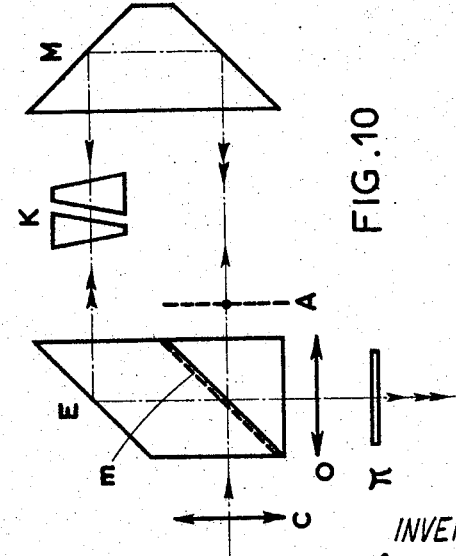

The arrangement shown in FIGURE 10 makes use of a divider block E, and of a reflecting prism M. The semitransparent mirror $m$ is applied on an internal bonding surface of said divider. Object A is placed near mirror $m$. The adjustment of the number and of the orientation of the fringes may be effected, in a known way, by means of a so-called diasparometer device, as shown in K.

In the alternative embodiment of FIGURE 10a, the reflecting prism $M_1$ is a tri-rectangular trihedral and presents a roof which enables the interferometer to maintain its angular adjustment.

In FIGURE 10b, prism $M_1$ is replaced by a lens $O_1$ combined with a plane mirror M located at the focal point of lens $O_1$.

Figure 10C:
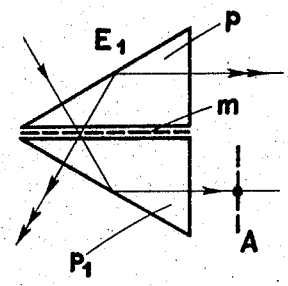

In FIGURE 10c, the divider block $E_1$ is constituted by a pair of prisms $p$ and $p_1$, the angles of which are 30° and 60°, separated by a semireflecting surface $m$.

The luminosity of the interferometers of the point-reference type, which avail themselves of an arrangement somewhat similar to the Sagnac interferometer or the like is the highest of that given by any of the arrangements according to the invention. This luminosity is theoretically equal to 1; in practice, it is advantageous to introduce a polariser (such as $\pi$, FIGURE 10) the plane of vibration of which is perpendicular to the plane of the figure. Actually, the coherent division of the wave on mirror $m$ is not readily possible but for a single direction of vibration, of which the best will be selected. The real transmission of this interferometer is therefore equal to 50% with crystal-type polariser.

Figure 11:
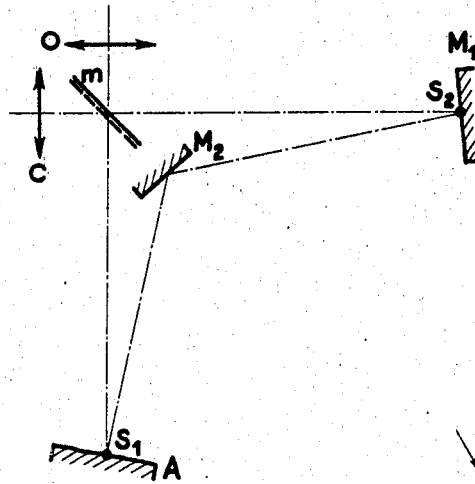

For the study of reflecting surfaces, the arrangement represented in FIGURE 11 is advantageously made use of. This arrangement differs from that illustrated in FIGURE 9 by the position conferred to the reflecting mirrors $M_1$ and $M_2$, which are here respectively arranged for the study of object A under a substantially normal incidence.

It is apparent that the devices 8, 10 and 11 do not very well lend themselves to microscopic examinations, since objective O is separated from the object by the oblique mirror $m$, which limits its power to that of low-magnification microscopes.

These latter arrangements according to the invention may however also be applied to high-magnification microscopes.

Figure 12:
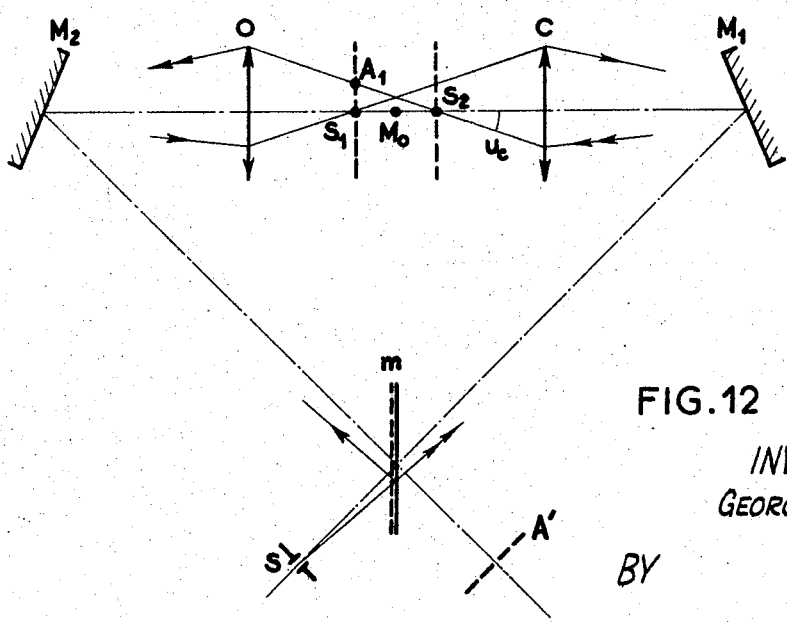

FIGURE 12 illustrates diagrammatically such an example, in this case, mirrors $m$, $M_1$ and $M_2$ are arranged as shown in the case of FIGURE 9a, but the lenses O and C are here inserted in the circuit, rather than being outside the same. Assuming the powers of lenses O and C are identical, they are placed symmetrically with respect to the central point $M_0$ for observing the interferences. If S is a point-source, objective O forms an image $S_1$ thereof and condenser C provides thereof an image $S_2$, $S_1$ and $S_2$ being separated by a distance $l$. The ray $\rho$ of the field on the object placed on image $S_1$ will then be:

$$\rho = l \tan u_c$$

$u_c$ being the aperture of the light beam.

In practice, a rigorous identity of lenses O and C is not absolutely required. It suffices that the imaginary lens, equivalent to the unit formed by the systems O and C, coincides with the center $M_0$.

For the same purpose, a birefringent prism may be used as a beam divider. In such a case, the angular separation of the beams is generally very small, rendering it necessary to resort to special arrangement, resulting in a lengthy assembly. The device illustrated in FIGURE 13 comprises a birefringent prism Q, a quarter-wave plate $\lambda/4$, two polarisers $\pi_1$ and $\pi_2$ crossing at right angles, the semitransparent mirror M conjugated with prism Q relative to the system of objectives $O_1O_2$ which is of the non-focal type and of magnification $g=-1$; object A is in contact with objective $O_2$. The light issued from a point-source S is transmitted onto the birefringent Q through a semitransparent mirror M; the central ray is divided in two rays separated by an angle $2\alpha$. Due to the features conferred to the arrangement, the two waves, polarised at right angles, propagate in the reverse direction, in a similar way to what is shown in the device illustrated in FIGURE 9. The overlapping on one another of the beams is avoided by selecting the angular splitting $2\alpha$ and the focal length of objectives $O_1$ and $O_2$ as a function of the object-field. For instance, in the case illustrated, source S is placed at a distance twice the focal length of the objective $O_1$; this objective provides of source S an image $S_1$ located at a distance twice the focal length $f$ of objective $O_1$ and coinciding with objective $O_2$, by forming on the center of object A, so as to overlap only the portion of said objective $O_2$ located at left (in the figure): this is achieved by giving $2\alpha$ (shift imposed by prism Q) the value resulting from the equation:

$$\rho_1 = \alpha f$$

where $\rho_1$ is the ray of the object field. A second image $S_2$ of the source is provided on the portion symmetrical to $O_2$ and not overlapped by the object.

The images $S_1'$ of image $S_1$ and $S_2'$ of image $S_2$ appear as blended in the image space and the real image of the object interferences is then formed in A', symmmetrical to source S reltaive to mirror M. The quater-wave plate $\lambda/4$ placed below prism Q is necessary in the case considered where the image of prism Q in onto itself with a magnification equal to $+1$.

Figure 13:
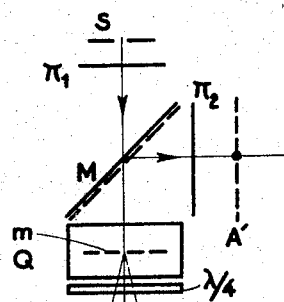
FIG. 13 illustrates an example of an arrangement with a beam-divider birefringent prism.
Figure 13:
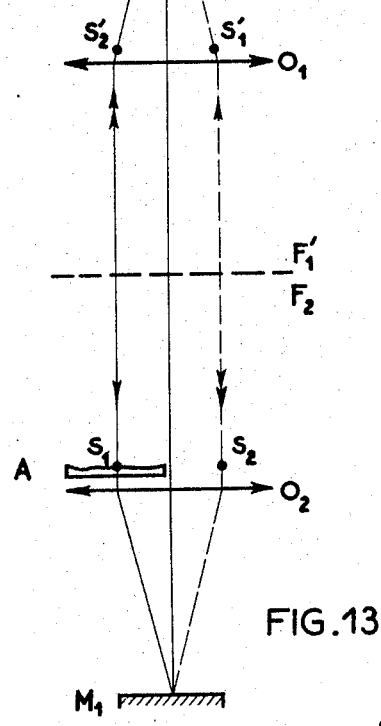
Figure 13A:
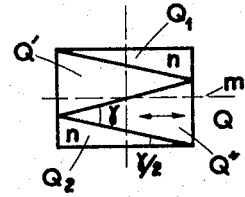
Figure 13B:
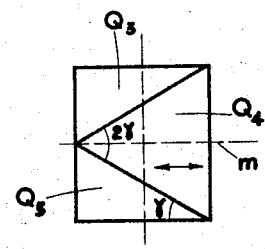

FIGURES 13a and 13b show, with the dotted line symbolizing the separation plane of the beams, two possible embodiments of birefringent prisms adapted to be applied to the arrangement given in FIGURE 13: it is namely out of question to make use of the known Wollaston prism, in spite of the simplicity of the latter, since the localisation surface of the fringes, on which is also localized the separating action of the beam, is oblique.

This drawback is avoided by means of the arrangement illustrated in FIGURE 13a, which includes two crystal prisms Q' and Q" with crossed axes and which are completed by two prisms $Q_1$ and $Q_2$ made of glass the index $n$ of which is equal to the mean index of the crystal used. The crystal prisms have an angle $\gamma$ and the glass prisms an angle $\gamma/2$.

The arrangement illustrated in FIGURE 13b may also be utilized; it comprises three crystal prisms $Q_3$, $Q_4$, $Q_5$, with crossed axes, the external prisms $Q_3$ and $Q_5$ having an angle $\gamma$ and the central prism $Q_4$ an angle $2\gamma$. The $\alpha$ splitting is given by formula:

$$\alpha \cong \Delta n \tan \gamma$$

in the case of FIGURE 13a, and by formula:

$$\alpha \cong 2\Delta n \tan \gamma$$

in the case of FIGURE 13b.

Figure 14:
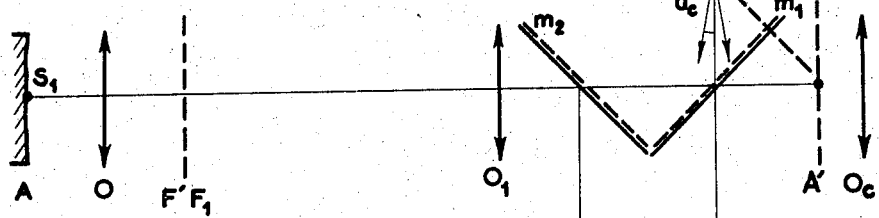
FIG. 14 illustrates the use of a nonfocal conveying system placed between the object and a duplicator of the nonfocal type.

In the case of an optical instrument such as a microscope, where the space comprised between the object and the objective is too small to accommodate a nonfocal duplicator, the arrangement according to FIGURE 14 may be used, showing such a nonfocal-type of wave duplicator, according to the invention. Four oblique mirrors $M_1$, $M_2$ (transfer mirrors) and mirrors $m_1$ and $m_2$ (semitransparent mirrors) are inserted between objective $O_1$ and the real image $A'$ of object A assumed to be reflecting, and which is observed through the ocular $o_c$, the objective O of the microscope forms a nonfocal system with the auxiliary objective $O_1$. Point source S is placed symmetrically to the center of the image relative to mirror $m_1$. Under these conditions, the real image $A'$ of object A forms at the image focus of objective $O'$ and the space at the right (in the drawing) of $O_1$ possesses the same properties as the space in front of the object A itself, except as concerns the aperture of the beam $u$, given by relation:

$$\sin u_c' = \sin u_c / g$$

where $g = f_1/f$.

where $f_1$ is the focal length of objective $O_1$ and $f$: the focal length of objective O. The point source S will then allow the interferential image of surface A to be observed in $A'$. The ray $\rho$ of the interferential image field is given by:

$$\rho = l \tan u_c'$$

where $l$ is given by $$l = 2m_1 M_o - m_1 m_2$$

and where the angle $u_c'$ is connected to the numerical aperture $u_c$ of the objective by the following relation:

$$\sin u_c / \sin u_c' = f_1/f = g$$

The arrangement illustrated in FIGURE 14 makes thus available a practical means for acheiving an interferential microscope, wherein the interferometric arrangement is located on the side of the ocular and wherein the objectives may be readily changed.

It is obvious that the wave duplicator described in connection with this example may be replaced by any other nonfocal/type.

What I claim is:

1. An interferometer arrangement for the study of an object comprising: a source of white light of small diameter and good luminescence, a condenser lens receiving light from said source and forming a first ordinary image of said source in the plane of the object,
    a first wave duplicator intermediate said source and said object for forming a first extraordinary image of said source spaced apart from said first ordinary image of said source, said ordinary and extraordinary images being formed by beams having the same angle of aperture,
    an objective lens for forming a pair of secondary images of said source,
    a second wave duplicator intermediate said object and said objective lens, said objective lens forming directly a secondary ordinary image of said first extraordinary image and, in cooperation with said second wave duplicator, a secondary extraordinary image of said first ordinary image of said source,
    whereby both of said secondary images of said source are formed in the exit pupil of said objective lens to provide an interference image of the object in its conjugate plane as transmitted by said objective.

2. An interferometer arrangement as in claim 1 including a beam splitter and recombiner intermediate said source and said first pair of ordinary and extraordinary images of said source and wherein said wave duplicators comprise a single pair of mirrors so angularly related with respect to one another and said beam splitter as to receive the reflected and transmitted rays passed thereby and to provide a pair of optical ray paths passing in opposite directions through the object for recombination at said beam splitter.

3. A device according to claim 2, in which one wave duplicator is adjacent the condenser and one wave duplicator is associated to the objective.

4. A device according to claim 3, in which the wave duplicators are identical.

5. A device according to claim 3, in which the wave duplicators operate independently of their optical associated lenses.

6. A device according to claim 3, in which the wave duplicators operate in cooperation with their associated lenses.

7. A device according to claim 3, in which the wave duplicators comprise bi-refringent prisms.

8. A device according to claim 3, in which each of the wave duplicators comprises at least one half-reflecting mirror.

References Cited

UNITED STATES PATENTS 2,660,922 12/1953 Philpot.
3,162,713 12/1964 Koester et al. _____ 350—12
3,180,216 4/1965 Osterberg.

RONALD L. WIBERT, *Primary Examiner.*

T. MAJOR, *Assistant Examiner.*

U.S. Cl. X.R.

350—13